United States Patent
Brumley et al.

(10) Patent No.: US 9,460,312 B2
(45) Date of Patent: Oct. 4, 2016

(54) DATA INTEGRITY PROTECTION FROM ROLLBACK ATTACKS FOR USE WITH SYSTEMS EMPLOYING MESSAGE AUTHENTICATION CODE TAGS

(71) Applicant: QUALCOMM Incorporated, San Diego, CA (US)

(72) Inventors: Billy Bob Brumley, San Diego, CA (US); Vinoth Kumar Deivasigamani, San Diego, CA (US); Satish Nithianandan Anand, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 14/205,226

(22) Filed: Mar. 11, 2014

(65) Prior Publication Data
US 2015/0261975 A1 Sep. 17, 2015

(51) Int. Cl.
G06F 21/64 (2013.01)
H04L 9/06 (2006.01)
H04L 9/32 (2006.01)
H04L 29/06 (2006.01)

(52) U.S. Cl.
CPC ............ G06F 21/64 (2013.01); H04L 9/0643 (2013.01); H04L 9/3242 (2013.01); H04L 63/12 (2013.01)

(58) Field of Classification Search
CPC ..... G06F 21/64; H04L 9/3242; H04L 63/12; H04L 9/0643
See application file for complete search history.

(56) References Cited

U.S. PATENT DOCUMENTS

| | | | | |
|---|---|---|---|---|
| 4,933,969 A * | 6/1990 | Marshall | ................. | G06F 21/64 340/5.74 |
| 8,356,178 B2 * | 1/2013 | Hars | ...................... | G06F 21/64 380/28 |
| 8,452,984 B2 * | 5/2013 | Garay | ................... | H04L 9/0631 713/190 |
| 2002/0152396 A1 | 10/2002 | Fox et al. | | |
| 2005/0044401 A1 * | 2/2005 | Morrow | ................ | G06F 11/006 726/22 |
| 2008/0082648 A1 | 4/2008 | Ahmed et al. | | |
| 2009/0019551 A1 | 1/2009 | Haga et al. | | |
| 2009/0100272 A1 * | 4/2009 | Smeets | ................. | G06F 21/121 713/189 |
| 2009/0144563 A1 | 6/2009 | Souza et al. | | |
| 2013/0167228 A1 | 6/2013 | Wong | | |
| 2013/0198853 A1 | 8/2013 | McKeen et al. | | |
| 2014/0164725 A1 * | 6/2014 | Jang | ....................... | G06F 21/575 711/163 |
| 2015/0006789 A1 * | 1/2015 | Buer | ....................... | G06F 21/44 711/103 |

FOREIGN PATENT DOCUMENTS

| | | |
|---|---|---|
| WO | WO-2010024874 A2 | 3/2010 |
| WO | WO-2013128317 A1 | 9/2013 |

OTHER PUBLICATIONS

International Search Report and Written Opinion—PCT/US2015/018359—ISA/EPO—Jun. 1, 2015.

* cited by examiner

Primary Examiner — Matthew Smithers
(74) Attorney, Agent, or Firm — Loza & Loza, LLP

(57) ABSTRACT

One feature pertains to an efficient procedure for storing data units in a storage device that allows for authentication of data units to prevent rollback attacks and other attacks such as cut-and-paste attacks. In one aspect, a message authentication code (MAC) is generated or otherwise obtained based on a primary key, a data unit to be stored, a corresponding index for the data unit (such as a page index) and a secondary key for the corresponding data unit, which is generated for each new write operation. The MAC and the corresponding data unit are stored in a bulk storage device such as a relatively insecure off-chip storage. Secondary keys are stored in a separate storage device such as a more secure on-chip storage. In some examples, new secondary keys are generated upon each data write based on a non-zero random or pseudorandom value.

26 Claims, 12 Drawing Sheets

*Summary of Method For Storing Data To Permit Authentication Of The Data*

DATA INTEGRITY PROTECTION FROM ROLLBACK ATTACKS FOR USE WITH SYSTEMS EMPLOYING MESSAGE AUTHENTICATION CODE TAGS

BACKGROUND

1. Field

Various features relate to data authentication and particularly to message authentication code (MAC) tags for use with data stored in mobile computing devices.

2. Background

Data integrity/authentication can be provided in a data storage system by storing tags or hashes alongside the data, such as MAC tags. For example, a MAC tag may be generated for use with a data unit to be stored by applying a message authentication algorithm (MAA) to the secret key and the data. The data unit and the MAC tag are then stored in a storage device such as a memory device. When the data unit is subsequently read from storage, a new MAC tag is generated based on the retrieved data and the original secret key. If the new MAC tag differs from the stored MAC tag, the data unit is rejected as being corrupted. If the new MAC tag is the same as the stored MAC tag, the data is thereby authenticated and deemed trustworthy. However, if data is updated legitimately over time, an attacker could replace a valid (data unit, tag) pair in the storage device with an old (data unit, tag) pair. This is an example of a rollback attack. In particular, the problem can arise when data is stored in a relatively insecure storage device such as an off-chip storage that is external to a more secure System-on-a-Chip (SoC) processing circuit of the type used, e.g., in mobile wireless devices. Another form of attack such storage systems are susceptible to is a cut-and-paste attack in which an attacker substitutes a section of encrypted data with a section of encrypted data from another location with the hope that the resulting decrypted data will be identical when placed at the new location compared to the old location. Mitigation of these forms of attacks can be expensive because effective mitigation may require storage of state data in a secure storage such as within an on-chip storage. For example, in an extreme case, all the tags may be stored within a secure on-chip storage to completely prevent a rollback attack of data in off-chip storage. Such an implementation is impractical due to storage and performance requirements.

Therefore, there is a need to protect data integrity from various types of attacks.

SUMMARY

A method for storing data to permit authentication of the data includes: obtaining a message authentication code based on a primary key, a data unit to be stored, a corresponding index for the data unit, and a secondary key for the data unit; storing the message authentication code and the data unit in a first storage device; and storing the secondary key for the data unit in a second storage device.

In another aspect, a device includes a first storage device to store data units and message authentication codes, a second storage device to store authentication keys to authenticate data units of the first storage device, and a processing circuit coupled to the first and second storage devices with the processing circuit configured to: obtain a MAC based on a primary key, a data unit to be stored, a corresponding index for the data unit, and a secondary key for the data unit; store the MAC and the data unit in the first storage device; and store the secondary key for the data unit in the second storage device.

In yet another aspect, a device includes: means for obtaining a MAC based on a primary key, a data unit to be stored, a corresponding index for the data unit, and a secondary key for the data unit; means for storing the MAC and the data unit in a first storage device; and means for storing the secondary key for the data unit in a second storage device.

In still yet another aspect, a machine-readable storage medium includes one or more instructions which when executed by at least one processing circuit causes the at least one processing circuit to: obtain a MAC based on a primary key, a data unit to be stored, a corresponding index for the data unit, and a secondary key for the data unit; store the MAC and the data unit in a first storage device; and store the secondary key for the data unit in a second storage device.

DETAILED DESCRIPTION

Figure 1:
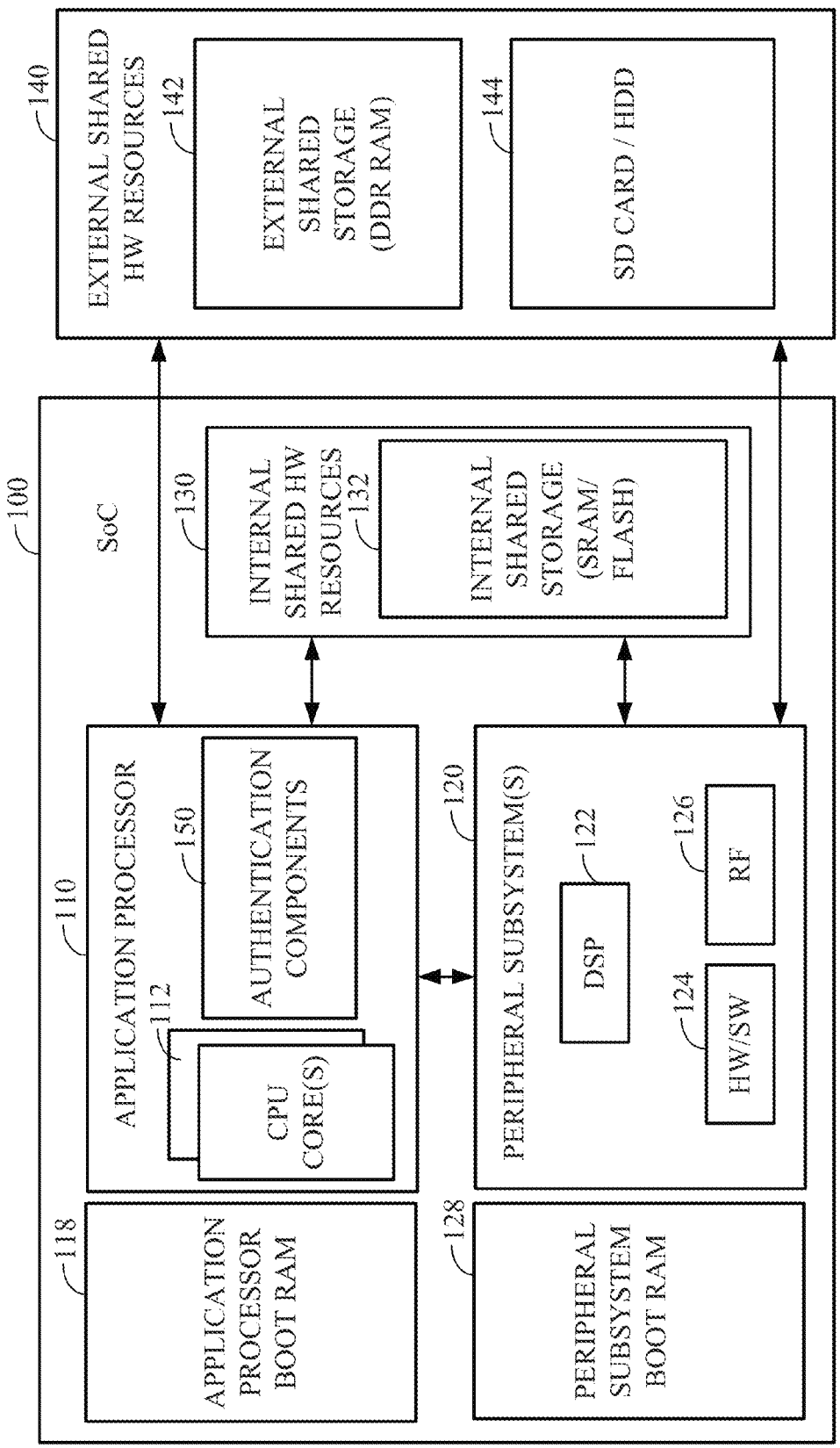
FIG. 1 illustrates a block diagram of a system on a chip (SoC) processing circuit of a mobile communication device in accordance with an illustrative example.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to storing data in storage devices such as memory devices to permit authentication of the data upon retrieval. The novel features may be used in systems having a relatively small but secure on-chip storage device such as an SRAM for use in conjunction with a larger but less secure off-chip storage device such as a DDR RAM. However, the features described herein are applicable in a wide range of systems and to achieve a variety of goals.

In one aspect, a data authentication component of a SoC processing circuit obtains MAC tags for use with data to be stored in an off-chip storage device wherein the MAC tags are based on a primary key, the particular data unit or message to be stored, a corresponding index for the data unit (such as a page index), and a secondary key (N) for the data unit. For example, the MAC may be a tag obtained by applying a message authentication algorithm (MAA) to a corresponding data unit index (i) based on a global primary key (K), the per data unit secondary key ($N_i$) and the data unit ($M_i$) to be stored. The MAC and the corresponding data unit are stored in the off-chip storage device. However, the secondary key is stored in a more secure on-chip storage forming part of the SoC. In various examples described herein, a new secondary key is obtained upon each new data write operation. That is, each time data is changed and new values are written to off-chip storage, the secondary key is loaded with a new random or pseudorandom value, which is stored in the more secure on-chip storage device. As such, the secondary key is unpredictable and unknown to a potential attacker. The attacker cannot directly access the secondary key since it is stored in the implicitly secure on-chip storage device.

In this regard, consider a system that stores data in data units (or pages). One can add integrity/authentication alongside the date units in a straightforward manner using a Message Authentication Algorithm (MAA). Denote Mi as data unit i. Each Mi has a corresponding tag $T_i$ obtained, for example, using an MAA (or generally any Pseudo-Random Function (PRF) or Key Derivation Function (KDF)) expressed as a function F that accepts a secret key K for use with a data unit M, i.e. T=F(K,M). For an example where data is to be stored in a DDR RAM, and the data units may represent chunks, segments or other suitable portions of the DDR RAM. However, the use of $T_i=F(K,M_i)$ does not prevent rolling back the data. For example, if $M_i$ is legitimately changed at some point to $\hat{M}_i$ with corresponding tag $\hat{T}_i$, then a potential adversary or malicious entity can overwrite $\hat{M}_i$ with $M_i$ and overwrite $\hat{T}_i$ with $T_i$. The system will then accept these previously valid values as still valid since the system will generate a new tag based on the retrieved data for comparison against the saved tag. The two tags will match and the system will not detect that the data at M has been rolled back along with its tag. One possible solution to this problem is to store each $T_i$ internally, e.g., with in an on-chip SRAM or equivalent that is implicitly secure. However, this solution may be too costly in terms of storage overhead and performance requirements. Instead, exemplary procedures described herein operate to apply additional input values to the MAA based on the secondary key N and its data unit index i such that a per data unit tag $T_i$ is obtained as $T_i=F(K, N_i, i, M)$.

In an example where each secondary key has b bits, the success probability for a rollback attack may be only $2^{-b}$. Accordingly, in an example where the time to perform one attack is about 200 milliseconds, a successful attack would take fourteen years or so to mount with any significant probability of success (assuming a suitable value for b such as 32 bits.) Hence, the secondary key provides rollback protection. The value of the index i (as a separate input to the MAA) helps prevent "cut-and-paste" attacks. To accommodate bootstrapping (which should not be confused with system boot), all secondary key values are initially set to zero and subsequent secondary key values are set to non-zero values. In this manner, the system can detect whether or not a page has been written to by examining the values. Hence, these techniques allow: (a) reduced internal storage to implement rollback protection since the secondary key can be small relative to the tag and (b) bootstrapping the system at time zero with essentially no added overhead.

Exemplary System-on-a-Chip Hardware Environment

FIG. 1 illustrates a system on a chip (SoC) processing circuit 100 of a mobile communication device in accordance with one example where various novel features may be exploited. The SoC processing circuit may be a Snapdragon™ processing circuit manufactured by Qualcomm Incorporated. SoC processing circuit 100 includes an application processing circuit 110, which includes a multi-core CPU 112. Application processing circuit 110 typically controls operation of all components of the mobile communication device. In one aspect, application processing circuit 110 includes data authentication components 150 equipped to perform MAC-based authentication employing a dynamically generated or otherwise obtained secondary key. Application processing circuit 110 may include a boot ROM 118 that stores boot sequence instructions for the various components of SoC processing circuit 100. SoC processing circuit 100 further includes one or more peripheral subsystems 120 controlled by application processing circuit 110. Peripheral subsystems 120 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., encryption, digital rights management (DRM)), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 4G Long Term Evolution (LTE) modems). Exemplary peripheral subsystem 120, which is a modem subsystem, includes a DSP 122, various hardware (HW) and software (SW) components 124, and various radio-frequency (RF) components 126. In one aspect, each peripheral subsystem 120 also includes a boot ROM 128 that stores a primary boot image (not shown) of the associated peripheral subsystems 120.

SoC processing circuit 100 further includes various internal shared HW resources 130, such as an internal shared storage 132 (e.g. static RAM (SRAM), double-data rate (DDR) synchronous dynamic (SD) RAM, DRAM, Flash memory, etc.), which is shared by application processing circuit 110 and various peripheral subsystems 120 to store various runtime data. In one aspect, components 110, 118, 120, 128 and 130 of SoC processing circuit 100 are integrated on a single-chip substrate. SoC processing circuit 100 further includes various external shared HW resources 140, which may be located on a different chip substrate and communicate with the SoC processing circuit 100 via a system bus (not shown). External shared HW resources 140 may include, for example, an external shared storage 142 (e.g. DDR RAM, DRAM, Flash memory) and/or permanent data storage 144 (e.g., a Secure Digital (SD) card or Hard Disk Drive (HDD), etc.), which are shared by application processing circuit 110 and various peripheral subsystems 120 to store various types of data, such as an operating system (OS) information, system files, programs, applications, user data, audio/video files, etc. When the mobile communication device incorporating the SoC is activated, secure SoC processing circuit 100 begins a system boot up process. In particularly, application processing circuit 110 accesses boot ROM 118 to retrieve boot instructions for SoC processing circuit 100, including boot sequence instructions for various peripheral subsystems 120. Peripheral subsystems 120 may also have additional peripheral boot RAM 128.

Exemplary Data Storage and Authentication Procedures

Figure 2:
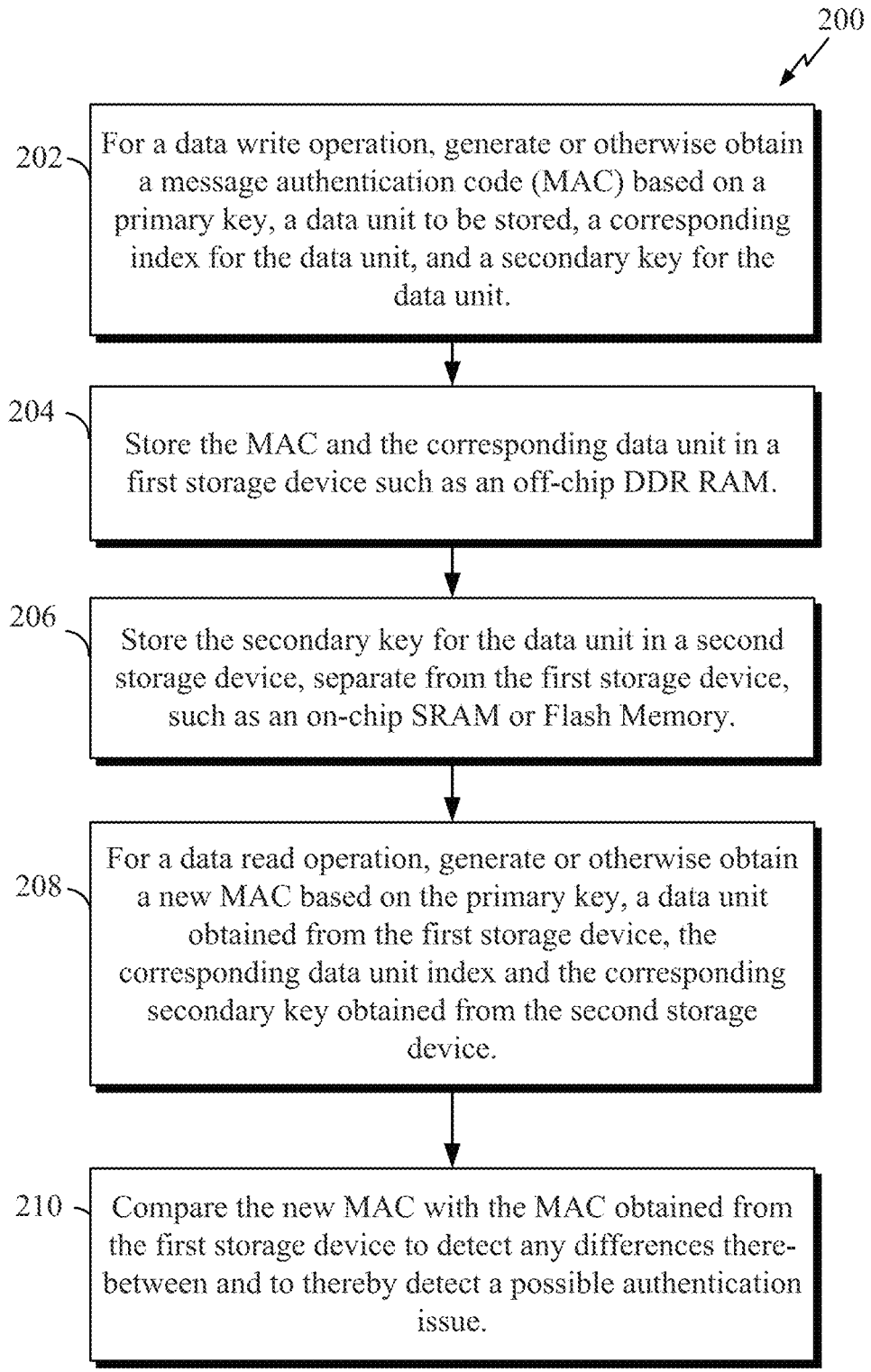
FIG. 2 provides an overview of a rollback mitigation procedure exploiting a secondary key for storage in a secure storage device.

FIG. 2 provides an overview of an exemplary procedure 200 that may be employed by the SoC processing circuit of FIG. 1, or other suitable-equipped devices, systems or processing circuits, for providing rollback protection (as well as cut-and-paste protection) by exploiting a secondary key. At step 202, for a data write operation, the processing circuit generates or otherwise obtains a MAC based on a primary key, a data unit to be stored, a corresponding index for the data unit, and a secondary key for the data unit, which is preferably set to a non-zero random or pseudorandom value. Herein, "obtaining" broadly covers, e.g., generating, acquiring, receiving, retrieving or performing any other suitable corresponding actions. At step 204, the processing circuit stores the MAC and the corresponding data unit in a first storage device such as the off-chip DDR RAM. At step 206, the processing circuit stores the secondary key for the data unit in a second storage device, separate from the first storage device, such as an on-chip SRAM or flash memory. Thereafter, for a data read operation, at step 208, the processing circuit generates or otherwise obtains a new MAC based on the primary key, a data unit obtained from the first storage device, the corresponding data unit index and the corresponding secondary key obtained from the second storage device. At step 210, the processing circuit compares the new MAC with the MAC obtained along with the message from the first storage device to detect any differences there-between so that the processing circuit may be and thereby detect a possible authentication issue.

Figure 3:
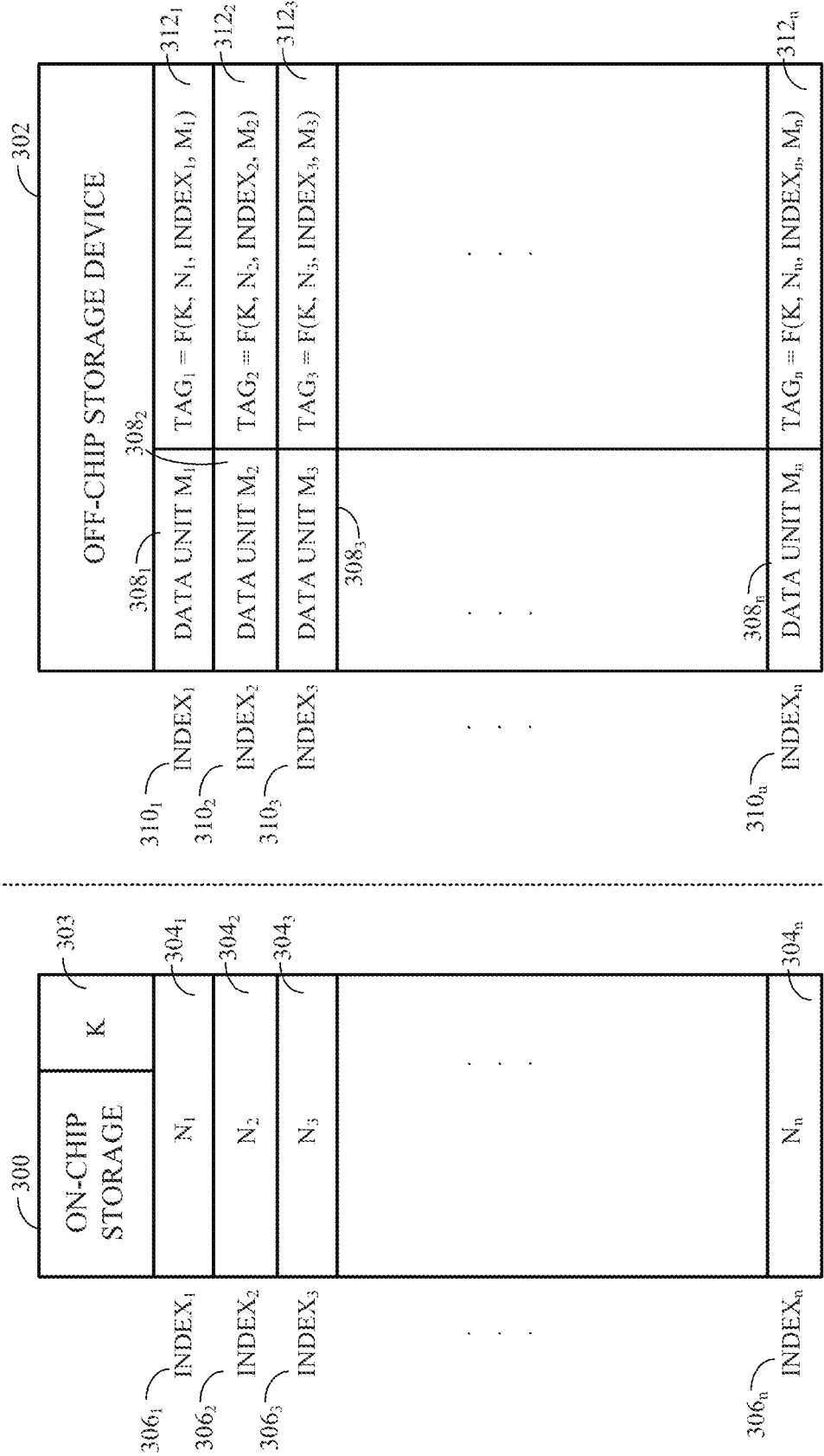
FIG. 3 illustrates exemplary data storage components for use with the general procedure of FIG. 2.

FIG. 3 illustrates exemplary on-chip and off-chip storage devices 300 and 302, respectively. On-chip storage 300 stores the primary key (K) 303, as well as the various secondary keys $N_1 \ldots N_n$, individually denoted by reference numerals $304_1 \ldots 304_n$, where each secondary key may be only four bytes. As noted, the secondary keys are initially set to zero and then dynamically generated as non-zero random or pseudorandom values, which are set or reset whenever the corresponding data unit in the off-chip storage is written to or altered. The secondary keys are stored at the corresponding page indices for the data $INDEX_1 \ldots INDEX_n$, individually denoted by reference numerals $306_1 \ldots 306_n$. Off-chip storage 302 stores the latest versions of the corresponding data units $M_1 \ldots M_n$, individually denoted by reference numerals $308_1 \ldots 308_n$, where each data unit may represent a page of data within an address space of the off-chip storage. The data units are stored at corresponding page indices $INDEX_1 \ldots INDEX_n$ within the address space, with the indices are individually denoted by reference numerals $310_1 \ldots 310_n$. The off-chip storage 302 also stores the relatively long MAC tags $TAG_1 \ldots TAG_n$, individually denoted by reference numerals $312_1 \ldots 312_n$ and shown as being a function F of the global key (K) and the corresponding secondary key ($N_i$), index ($INDEX_i$) and data unit ($M_i$), i.e. $TAG_1 = F(K, N_i, i, M_i)$.

Rollback attacks can be significantly mitigated within the system since, if a malicious entity attempts to insert an old data unit/tag pair into the off-chip storage at the same data unit index, the old tag (generated, in part, based on a randomly-generated but now obsolete secondary key) will not match the comparison tag generated based on the currently stored secondary key maintained in the on-chip storage. That is, the on-chip storage will have an updated secondary tag (generated when the data at that particular index was last updated.) Hence, when the processing circuit retrieving data from the off-chip storage performs a MAC authentication procedure, it will generate a comparison tag based on the retrieved data, the page index, the global key, and latest version of the secondary key stored in the on-chip storage. The comparison tag will not match the rolled back version of the tag stored in the off-chip storage (unless the new and old secondary tags coincidentally happen to be identical, which is an event of low probability given a four byte secondary key) and an appropriate error indicator will be generated.

Cut-and-paste attacks can be significantly mitigated since the index i is also used in the creation of the MAC tags stored in the off-chip storage. As noted above, in a cut-and-paste attack, an attacker or other malicious entity substitutes a section of encrypted data (e.g. ciphertext and its corresponding MAC tag) with a section of encrypted data from another location (e.g. ciphertext with a different MAC tag) with the hope that the resulting decrypted data will be identical when placed at the new location compared to the old location. However, with the data unit index i used in the generation of the MAC tags for storage in off-chip storage 302, MAC tags from different data units having different indices will thereby almost certainly be different from one another. The chance that the tags might coincidentally be the same in the cut-and-paste attack will be extremely small, at least within a typical storage space having a relatively large number of possible data unit indices (e.g. a large number of available pages.)

Figure 4:
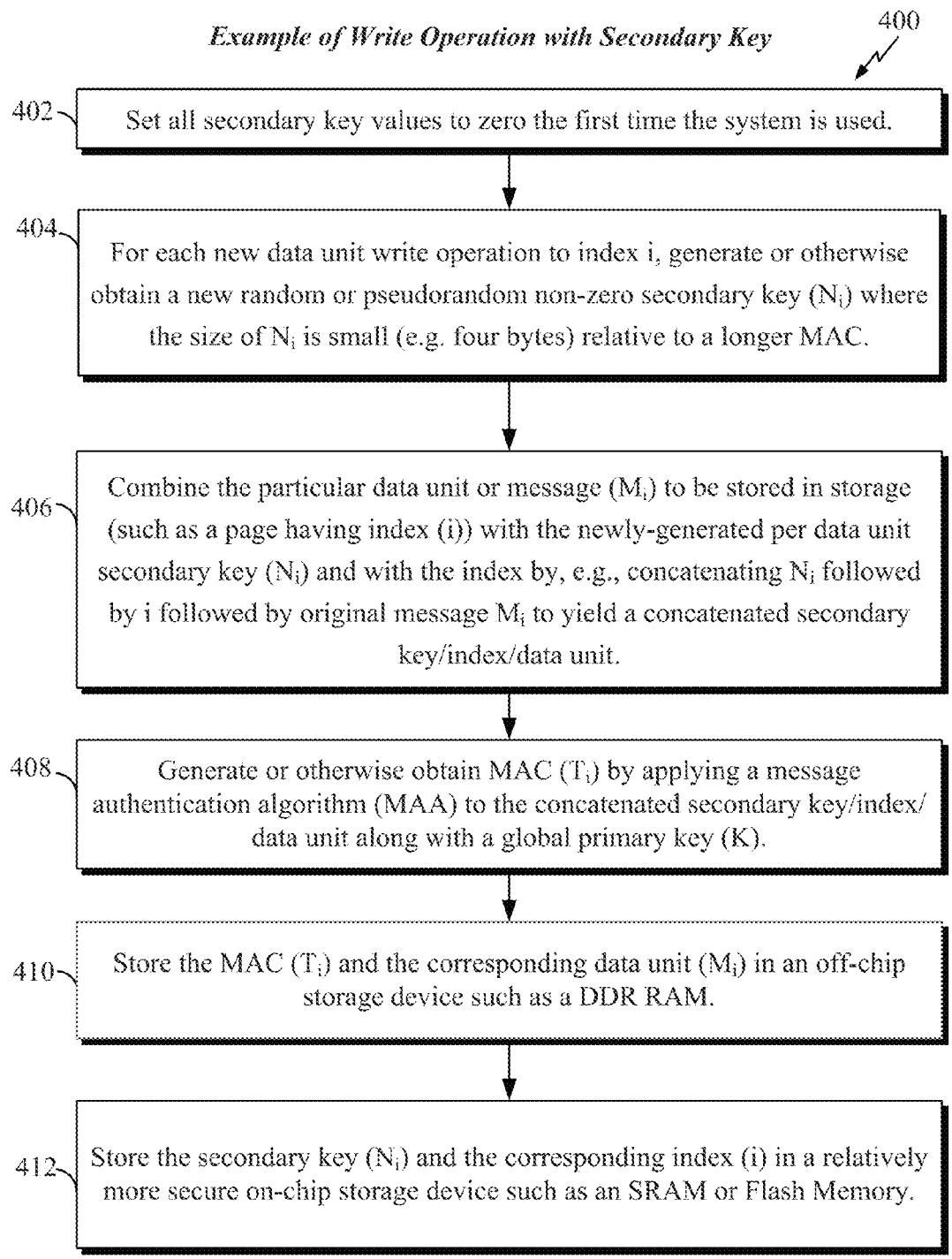
FIG. 4 illustrates an exemplary method for use with the general procedure of FIG. 2 for a write operation to off-chip storage exploiting the secondary key.

FIG. 4 illustrates an exemplary write operation or procedure 400 in greater detail, which may be performed by the SoC processing circuit of FIG. 1, or other suitable-equipped processing circuits. At step 402, the processing circuit sets all secondary key values to zero the first time the system is used, or to a suitable hexadecimal equivalent thereof. That is, the secondary key values are all set to zero before any portion of the storage is written to. The secondary keys are initially set to zero values so that the processing circuit can easily identify pages that have not yet been written to. As various write operations subsequently occur, the zero values are replaced with newly generated non-zero secondary key values. For example, at step 404, for a data unit write operation to index i, the processing circuit generates a new random or pseudorandom non-zero secondary key ($N_i$) where the size of $N_i$ is small (e.g. four bytes) relative to a longer MAC tag. Hence, new secondary keys are generated, re-generated or refreshed for each new data unit write. The size of $N_i$ is small relative to a MAC tag so as not to consume much on-chip storage, yet is sufficiently long (e.g. four bytes) to effectively mitigate rollback attacks and other attacks.

At step 406, the processing circuit combines the particular data unit or message ($M_i$) to be stored in storage (such as a page having an index (i)) with the newly-generated per data unit secondary key ($N_i$) and with the index (i). For example, each data unit may be concatenated as: $N_i$ followed by i, followed by data unit $M_i$ to yield a concatenated secondary key/index/data unit for applying to an MAA. That is, in this example, the secondary key, index and data unit are concatenated as: $\hat{M}_i = N_i \, i \, M_i$, where $M_i$ is the message to be stored, to thereby yield a modified version of the data unit for applying to the MAA that conveniently incorporates the index and secondary key. In this manner, the MAA does not need to be modified to accept four input values instead of two. Rather, an otherwise standard MAA may be employed.

At step 406, the processing circuit generates a MAC tag ($T_i$) by applying an MAA, which may be represented by function F, to the concatenated secondary key/index/data unit along with a global primary key (K). Hence, in this example, $T_i$ is generated as $T_i = F(K, N_i \, i \, M_i)$. At step 408, the processing circuit stores the MAC tag ($T_i$) and the corresponding data unit ($M_i$) in an off-chip storage device, such as a DDR RAM. At step 412, the processing circuit stores the secondary key ($N_i$) and the corresponding index (i) in a relatively more secure on-chip storage device, such as an SRAM.

Figure 5:
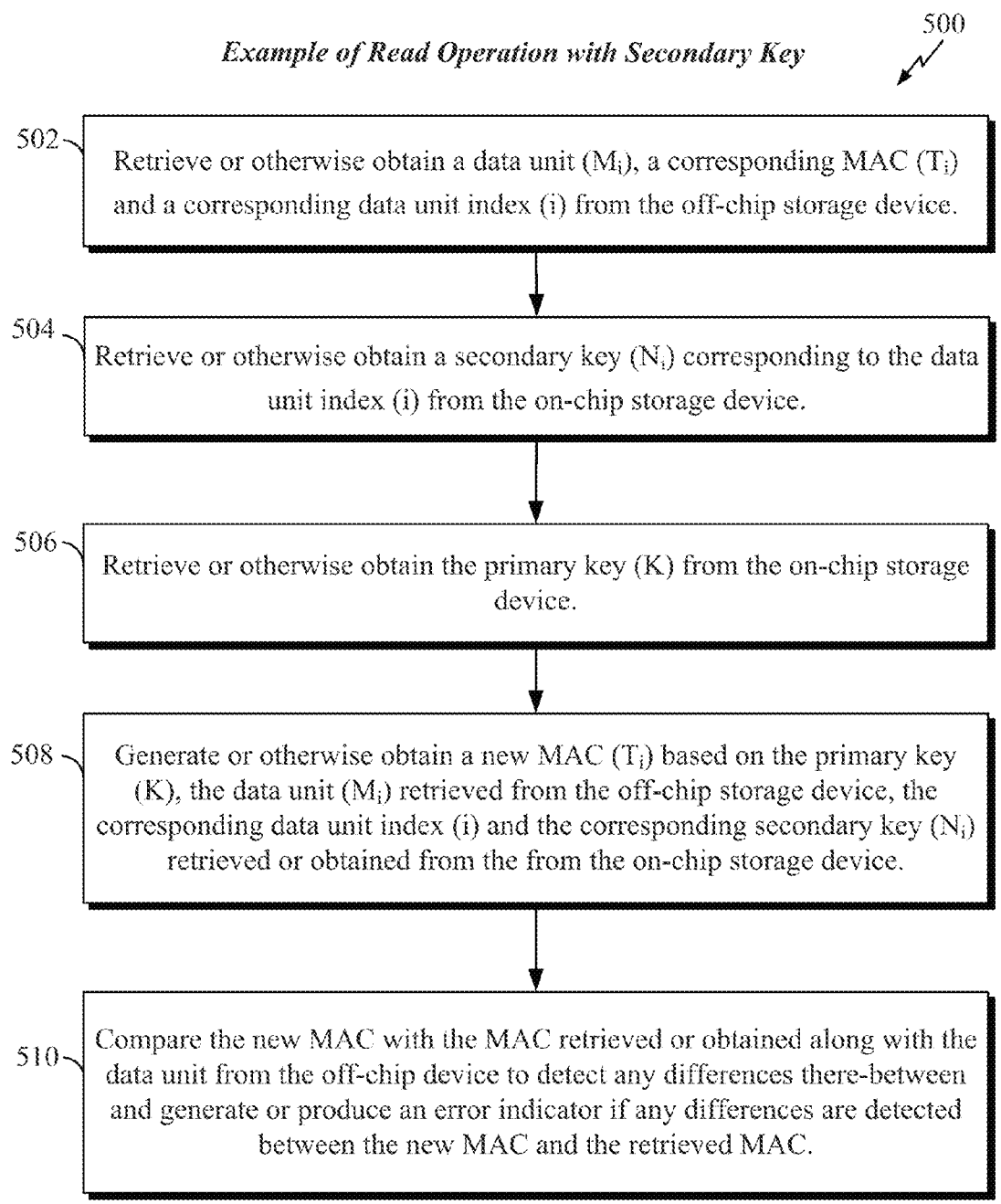
FIG. 5 illustrates an exemplary method for use with the general procedure of FIG. 2 for a read operation from off-chip storage exploiting the secondary key.

FIG. 5 illustrates an exemplary read operation or procedure 500 in greater detail, which may be performed by the SoC processing circuit of FIG. 1, or other suitable-equipped processing circuits. At step 502, the processing circuit retrieves a data unit ($M_i$), a corresponding MAC tag ($T_i$) from the corresponding data unit index (i) in the off-chip storage device. At step 504, the processing circuit retrieves a secondary key ($N_i$) corresponding to the data unit index (i) from the on-chip storage device. At step 506, the processing circuit also retrieves the primary key (K) from the on-chip storage device. At step 508, the processing circuit generates a new MAC tag ($T_i$) based on the primary key (K), the data unit ($M_i$) retrieved from the off-chip storage device, the corresponding data unit index (i) and the corresponding secondary key ($N_i$) retrieved from the from the on-chip storage device. At step 510, the processing circuit compares the new MAC tag with the MAC tag retrieved along with the data unit from the off-chip device to detect any differences there-between and generates an error indicator if any differences are detected between the new MAC tag and the retrieved MAC tag.

Figure 6:
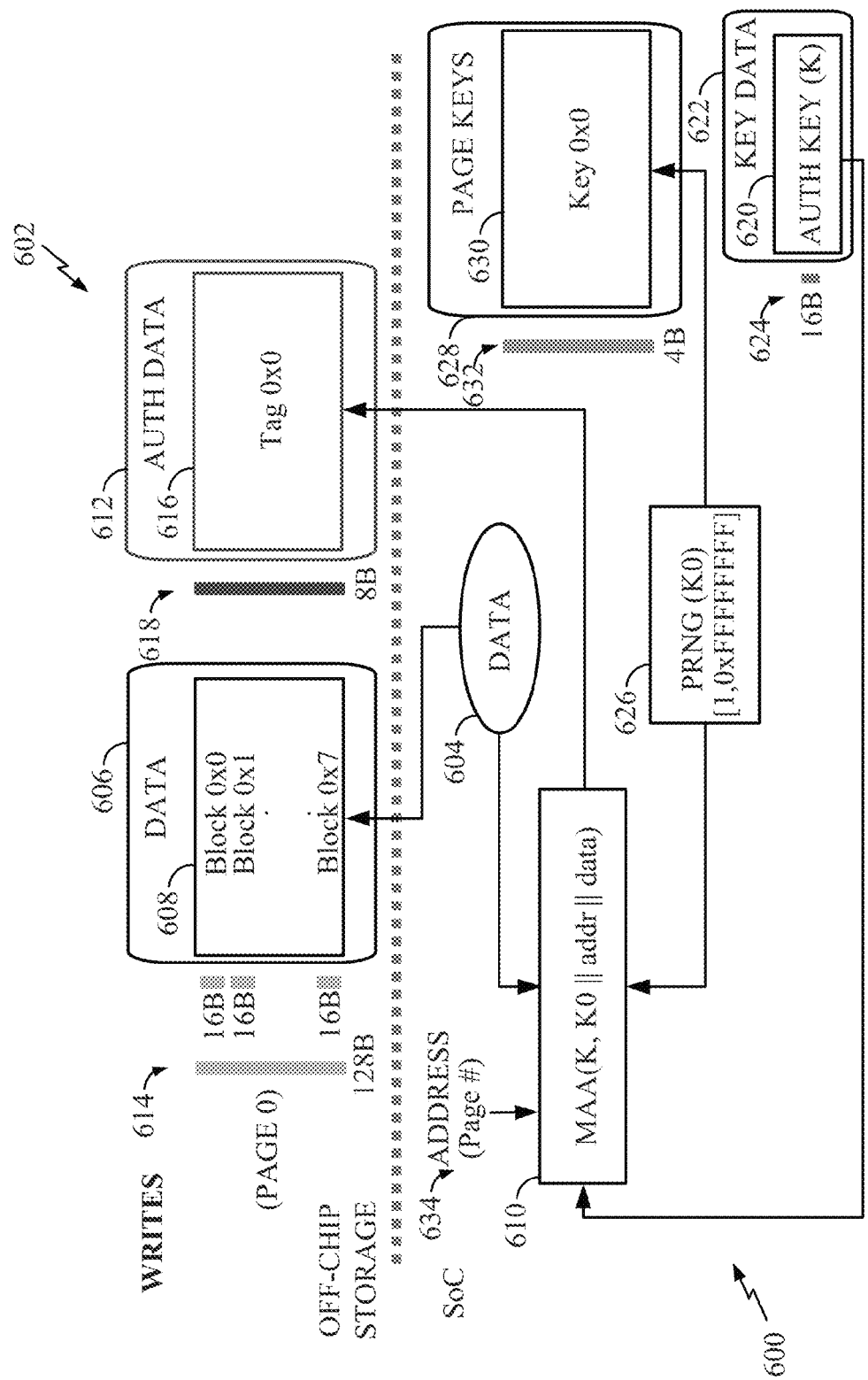
FIG. 6 illustrates an exemplary system for use with the general procedure of FIG. 2 for a write operation from off-chip storage exploiting the secondary key.

FIG. 6 further illustrates an exemplary write operation with reference to various components of an exemplary SoC 600 and an off-chip storage 602, where components are represented schematically. Data 604 to be stored is routed to an off-chip bulk data storage component 606 for storage therein within one or more blocks 608 and is also routed to an MAA component 610 of the SoC for generation of a corresponding MAC tag for storage within authorization data component 612 of the off-chip storage. In this example, a set of blocks 0x0 through 0x0 are shown in data component 606 each storing sixteen bytes and collectively providing a 128 byte page, denoted 614. In the example, an individual tag 0x0 616 of the authorization data component 612 consumes eight bytes, as denoted by 618. To generate the MAC, a global authorization key (K) 620 is retrieved from a key data component 622 of a storage device of the SoC. In this example, the global key is sixteen bytes, as denoted by 624. A pseudorandom number generator (PRNG) component 626 generates a secondary key (K0) for the write operation, within the range [1,0xFFFFFFFF]. As such, zero is excluded as a secondary key (for reason described above related to bootstrapping.) The secondary key is stored within a page key storage component 628 as a key 630, which in this example corresponds to key 0x0 and consumes four bytes, as denoted by 632. The secondary key is also routed into the MAA component 610, which concatenates the key with address 634 of the page to be written to and data 604 prior to applying an MAA function to generate a MAC tag. The resulting MAC tag is stored, as noted, in the authorization data component 612 of the off-chip storage for subsequent retrieval during a read operation.

Figure 7:
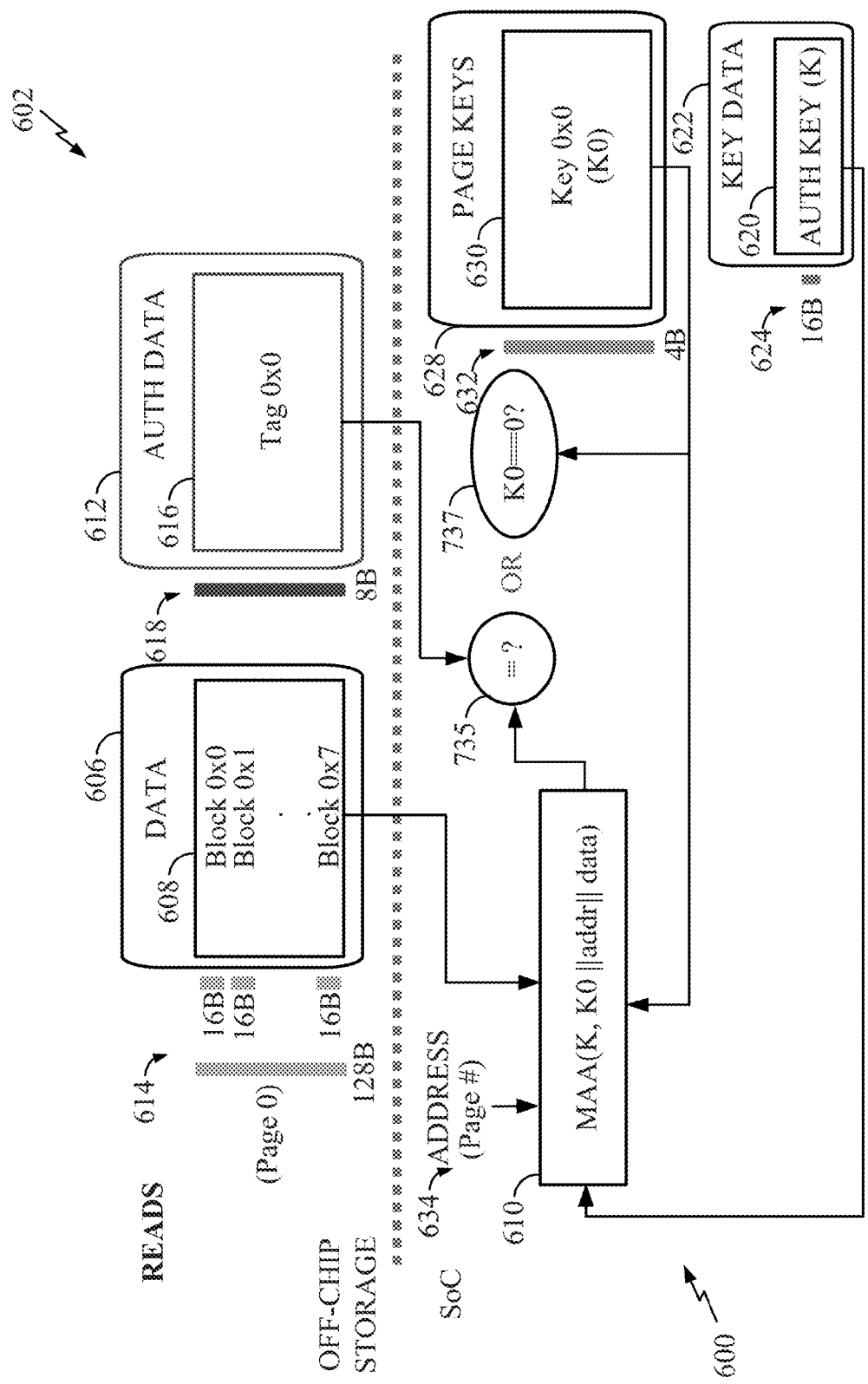
FIG. 7 illustrates an exemplary system for use with the general procedure of FIG. 2 for a read operation from off-chip storage exploiting the secondary key.

FIG. 7 further illustrates an exemplary read operation with reference to SoC 600 and off-chip storage 602, where components are again represented schematically. Data 608 is retrieved from off-chip bulk data storage component 606 and routed to MAA component 610 for generation of a corresponding comparison MAC tag for comparison against tag 616 stored within authorization data component 612 of the off-chip storage. To generate the comparison tag from the retrieved data, the global authorization key (K) 620 is again retrieved from a key data component 622. The secondary key (K0) for the data is retrieved from page key storage component 628 as a key 630 and routed into the MAA component 610, which concatenates the key with the page address 634 of the page being read and with the data 608 prior to applying an MAA function to generate a comparison MAC tag. The resulting comparison MAC tag is compared at decision block 735 with the MAC tag 616 retrieved from authorization data component 612 of the off-chip storage based on the page being read to determine if the two MAC tags are the same. If the comparison MAC tag and the retrieved MAC tag are the same, the retrieved data is thereby deemed valid and processed by the SoC (using various processing components not shown in this figure.) If the comparison MAC tag and the retrieved MAC tag are not the same, the retrieved data is deemed invalid and rejected by the SoC and read failure procedures are initiated to address the problem (using processing components not shown in this figure.) FIG. 7 also shows that secondary keys (K0) retrieved from secondary page key memory or storage component 628 are also applied to a zero comparison function 737 that determines whether the retrieved secondary key is zero, as would be the case if the page has not yet been written to (and hence contains no data to be read.) If zero, the retrieved data is rejected as being invalid by the SoC and procedures are initiated to address the problem (using processing components not shown in this figure.)

Exemplary System or Apparatus

Figure 8:
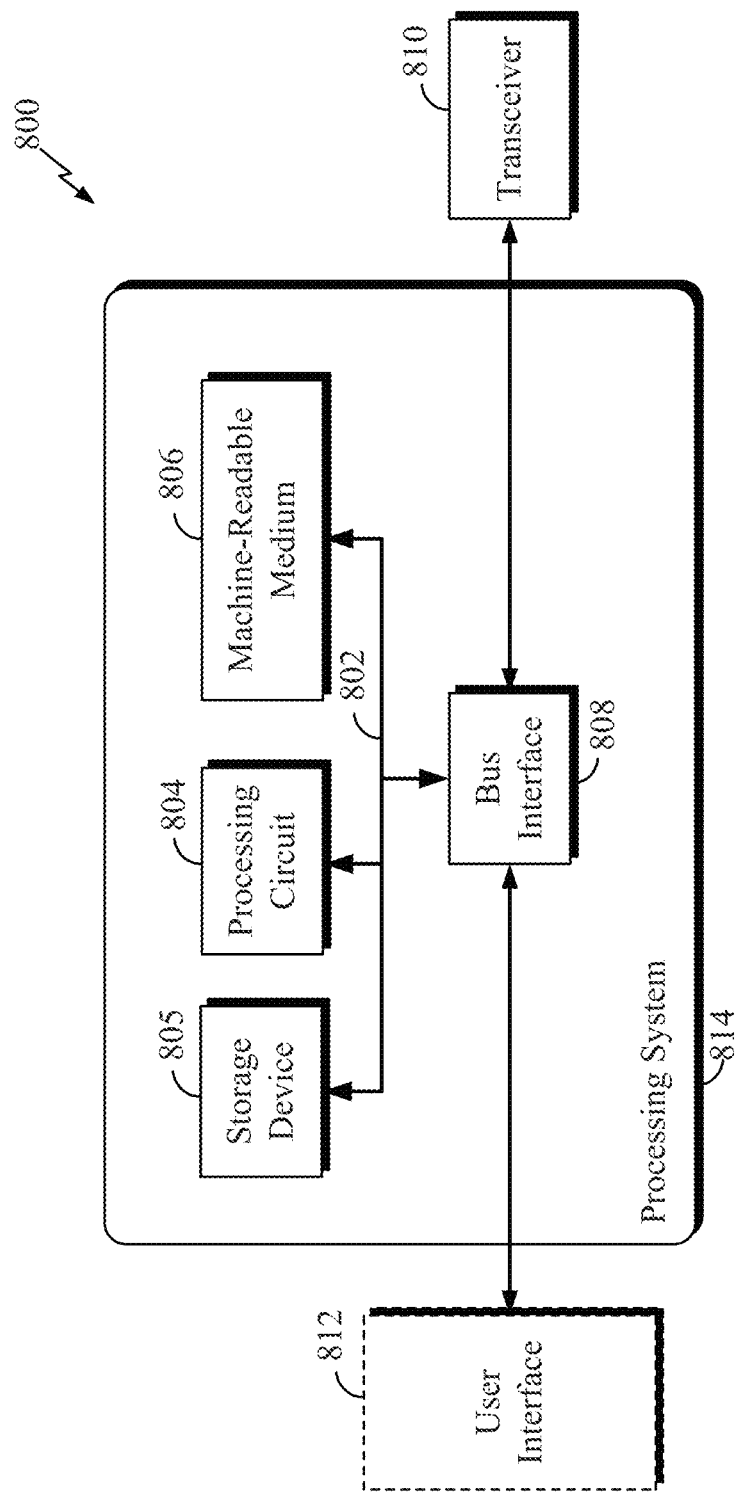
FIG. 8 is a block diagram illustrating an example of a hardware implementation for an apparatus employing a processing system that may exploit the systems, methods and apparatus of FIGS. 1-7.

FIG. 8 illustrates an overall system or apparatus 800 in which the components and methods of FIGS. 1-7 may be implemented. In accordance with various aspects of the disclosure, an element, or any portion of an element, or any combination of elements may be implemented with a processing system 814 that includes one or more processing circuits 804 such as the SoC processing circuit of FIG. 1. For example, apparatus 800 may be a user equipment (UE) of a mobile communication system. Apparatus 800 may be used with a radio network controller (RNC). In addition to an SoC, examples of processing circuits 804 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, processing circuit 804, as utilized in apparatus 800, may be used to implement any one or more of the processes described above and illustrated in FIGS. 1-7 (and those illustrated in FIGS. 11 and 12, discussed below), such as processes to perform authentication of data within storage device 805.

In this example, processing system 814 may be implemented with a bus architecture, represented generally by the bus 802. Bus 802 may include any number of interconnecting buses and bridges depending on the specific application of processing system 814 and the overall design constraints. Bus 802 links together various circuits including one or more processing circuits (represented generally by the processing circuit 804), storage device 805, and a machine-readable, processing circuit-readable or computer-readable media (represented generally by a non-transitory machine-readable medium 806.) Bus 802 may also link various other circuits such as timing sources, peripherals, voltage regulators, and power management circuits, which are well known in the art, and therefore, will not be described any further. Bus interface 808 provides an interface between bus 802 and a transceiver 810. Transceiver 810 provides a means for communicating with various other apparatus over a transmission medium. Depending upon the nature of the apparatus, a user interface 812 (e.g., keypad, display, speaker, microphone, joystick) may also be provided.

Processing circuit 804 is responsible for managing bus 802 and general processing, including the execution of software stored on the machine-readable medium 806. The software, when executed by processing circuit 804, causes processing system 814 to perform the various functions described herein for any particular apparatus. The machine-readable medium 806 may also be used for storing data that is manipulated by processing circuit 804 when executing software.

One or more processing circuits 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 806. The machine-readable medium 806 may be a non-transitory machine-readable medium. A non-transitory processing circuit-readable medium, processor-readable medium, machine-readable medium, or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a computer. The terms "machine-readable medium", "computer-readable medium", "processing circuit-readable medium", and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium", "computer-readable medium", "processing circuit-readable medium", and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer. The machine-readable medium 806 may reside in processing system 814, external to processing system 814, or distributed across multiple entities including processing system 814. The machine-readable medium 806 may be embodied in a computer program product. By way of example, a computer program product may include a processing circuit-readable medium in packaging materials. Those skilled in the art will recognize how best to implement the described functionality presented throughout this disclosure depending on the particular application and the overall design constraints imposed on the overall system.

In particular, the machine-readable storage medium 806 may have one or more instructions which when executed by processing circuit 804 causes the processing circuit to: obtain a message authentication code based on a primary key, a data unit to be stored, a corresponding index for the data unit, and a secondary key for the data unit; store the message authentication code and the data unit in a first storage device; and store the secondary key for the data unit in a second storage device.

One or more of the components, steps, features, and/or functions illustrated in the figures may be rearranged and/or combined into a single component, step, feature or function or embodied in several components, steps, or functions. Additional elements, components, steps, and/or functions may also be added without departing from the features and aspects described. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 100 and/or 804 illustrated in FIGS. 1 and 8 may be a specialized processing circuit (e.g., an ASIC)) that is specifically designed and/or hard-wired to perform the algorithms, methods, and/or steps described in FIGS. 2, 3, 5, 6 and/or 7 (and/or FIGS. 11 and 12, discussed below.) Thus, such a specialized processing circuit (e.g., ASIC) may be one example of a means for executing the algorithms, methods, and/or steps described in FIGS. 2, 3, 5, 6 and/or 7 (and/or FIGS. 11 and 12, discussed below.) The machine-readable storage medium may store instructions that when executed by a specialized processing circuit (e.g., ASIC) causes the specialized processing circuit to perform the algorithms, methods, and/or steps described herein.

Figure 9:
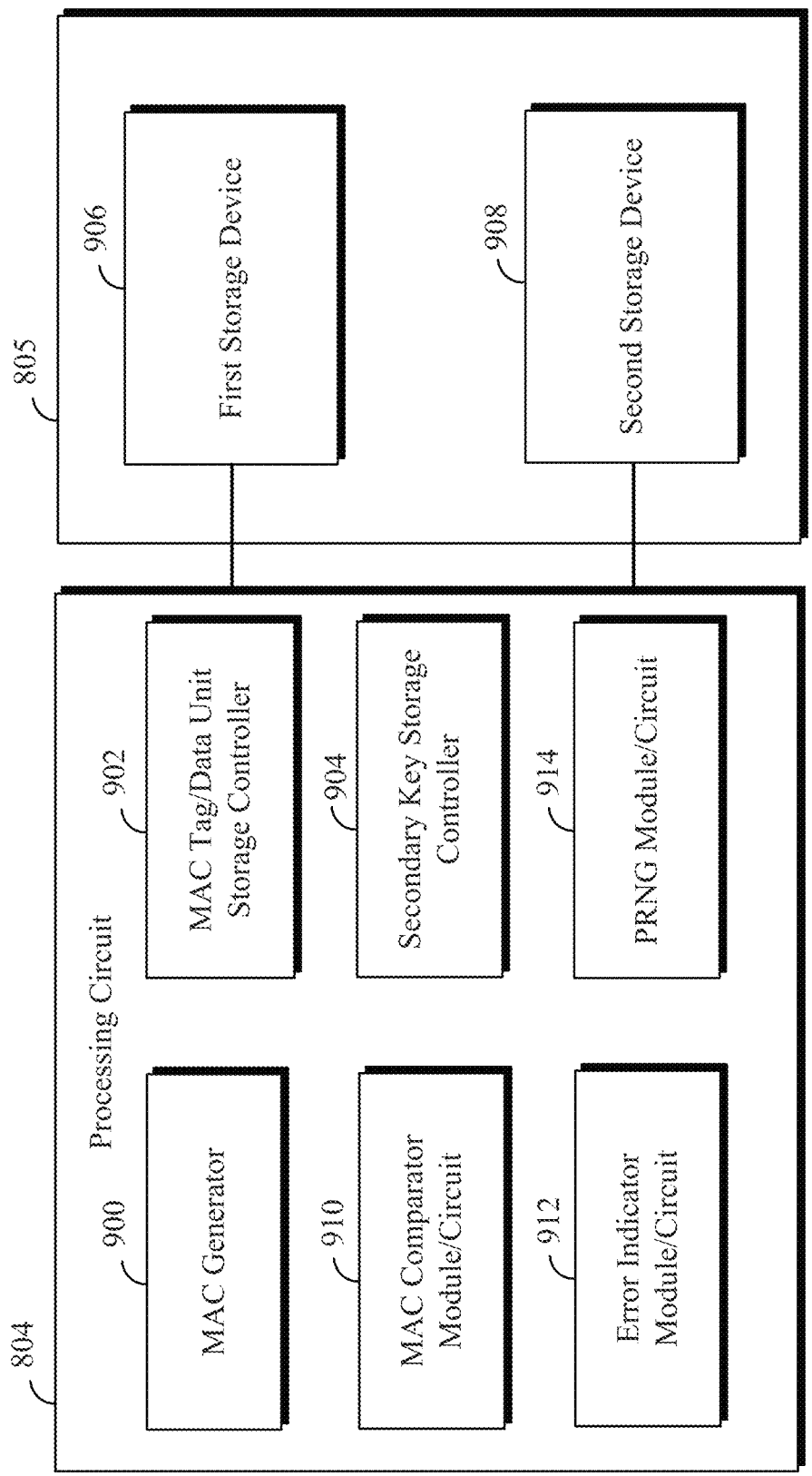
FIG. 9 is a block diagram illustrating components of the processing circuit of FIG. 8.

FIG. 9 illustrates selected and exemplary components of processing circuit 804. In particular, processing circuit 804 of FIG. 9 includes a MAC generator component 900 operative to generate, acquire, receive or otherwise obtain a MAC based on a primary key, a data unit to be stored, a corresponding index for the data unit, and a secondary key for the corresponding data unit. Processing circuit 804 also includes a first MAC tag/data unit storage controller 902 operative to store the MAC tag and the corresponding data unit in a first storage device 906 and a separate secondary key storage controller 904 operative to store the secondary key for the data unit in a second storage device 908 (where the first and second storage devices are separate components of generalized storage 805.) The processing may include additional components to perform or control various functions, such as a MAC comparator module/circuit 910 operative to compare a new MAC with a MAC obtained from the first storage device to detect any differences there-between. An error indicator module/circuit 912 may be provided that is operative to generate or produce an error indicator if any differences are detected between the new MAC and the MAC obtained from the first storage device. A PRNG module/circuit 914 may be provided to generate or otherwise obtain random or pseudorandom numbers for use in generating keys. Other components may be provided as well and the illustration of FIG. 9 is by no means exhaustive.

Figure 10:
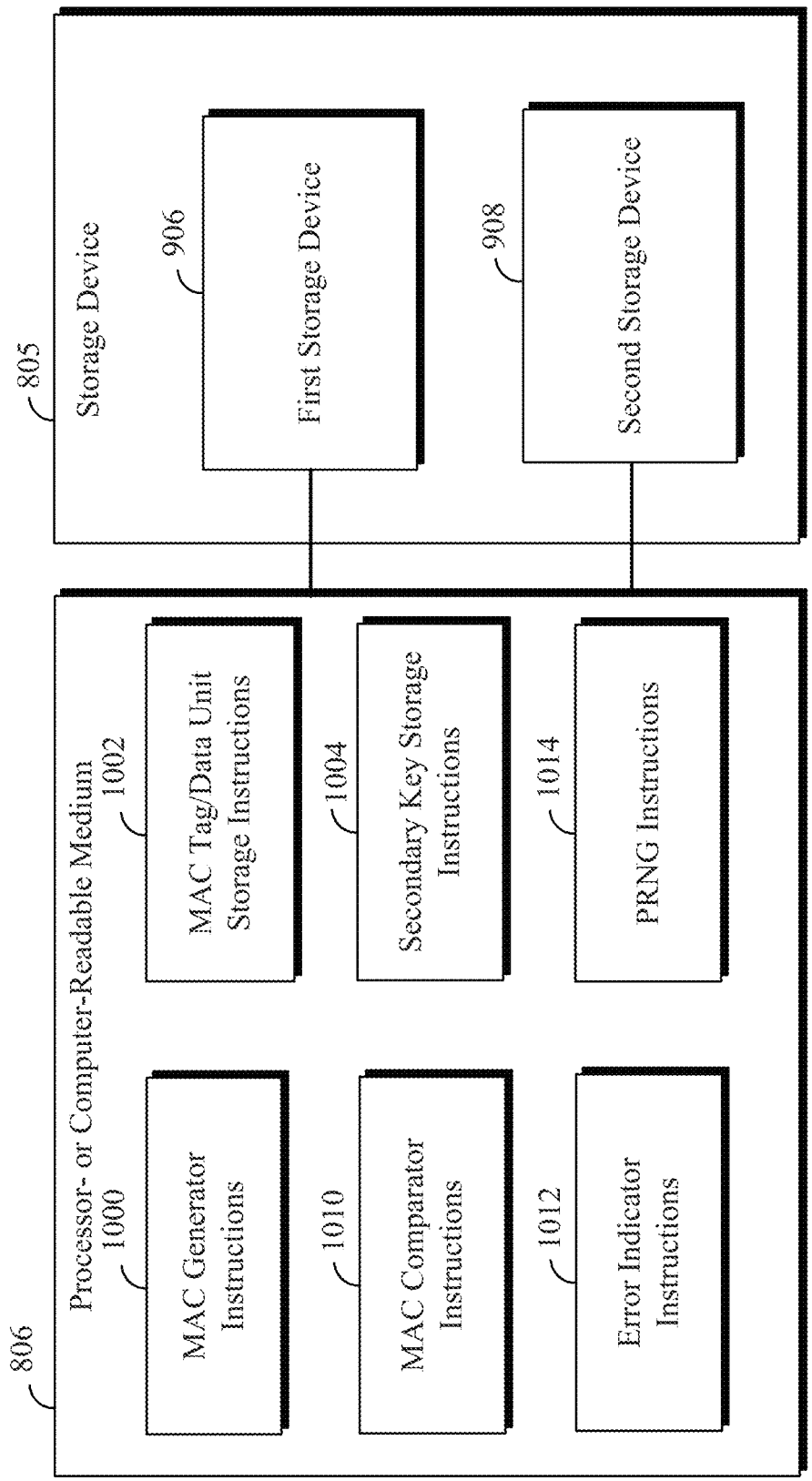
FIG. 10 is a block diagram illustrating instruction components of the machine-readable medium of FIG. 8.

FIG. 10 illustrates selected and exemplary instruction components of the machine-readable or computer-readable medium 806. In particular, machine-readable medium 806 of FIG. 10 includes MAC generator instructions 1000, which when executed by the processing circuit of FIG. 9, causes the processing circuit to generate, acquire, receive or otherwise obtain a MAC based on a primary key, a data unit to be stored, a corresponding index for the data unit, and a secondary key for the data unit. The machine-readable medium 806 also includes first MAC tag/data unit storage instructions 1002 to store the MAC tag and the corresponding data unit in a first storage device 906 and secondary key storage instructions 1004 to store the secondary key for the corresponding data unit in a second storage device 908 (where the first and second storage devices are components of storage 805.) The machine-readable medium 806 may include additional instructions to perform or control various functions, such as MAC comparator instructions 1010 to compare a new MAC with a MAC obtained from the first storage device to detect any differences there-between. Error indicator instructions 1012 may be provided to generate or produce an error indicator if any differences are detected between the new MAC and the MAC obtained from the first storage device. PRNG instructions 1014 may be provided to generate or otherwise obtain random or pseudorandom numbers for use in generating keys. Other instructions may be provided as well and the illustration of FIG. 10 is by no means exhaustive.

Figure 11:
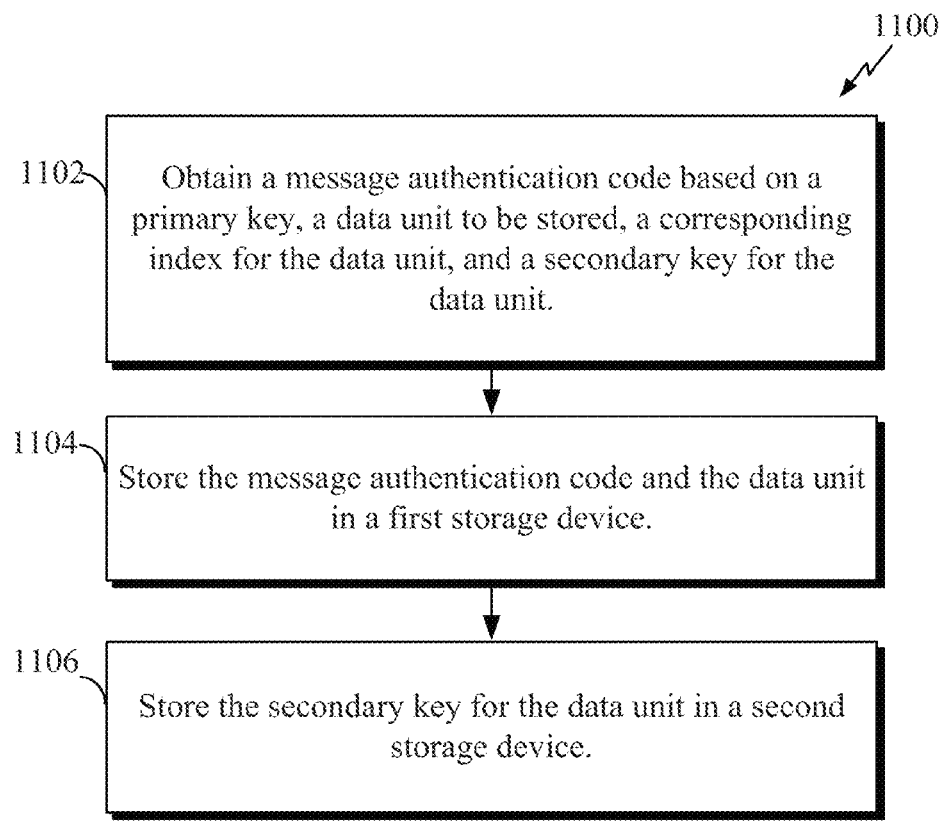
FIG. 11 summarizes an exemplary method for storing data to permit authentication of the data.

FIG. 11 broadly illustrates and summarizes methods or procedures 1100 that may be performed by processing circuit 804 of FIGS. 8 and 9 or other suitably equipped devices for storing data to permit authentication of the data. At step 1102, the processing circuit obtains a message authentication code based on a primary key, a data unit to be stored, a corresponding index for the data unit, and a secondary key for the data unit. At step 1104, the processing circuit stores the message authentication code and the data unit in a first storage device. At step 1106, the processing circuit stores the secondary key for the data unit in a second storage device.

Figure 12:
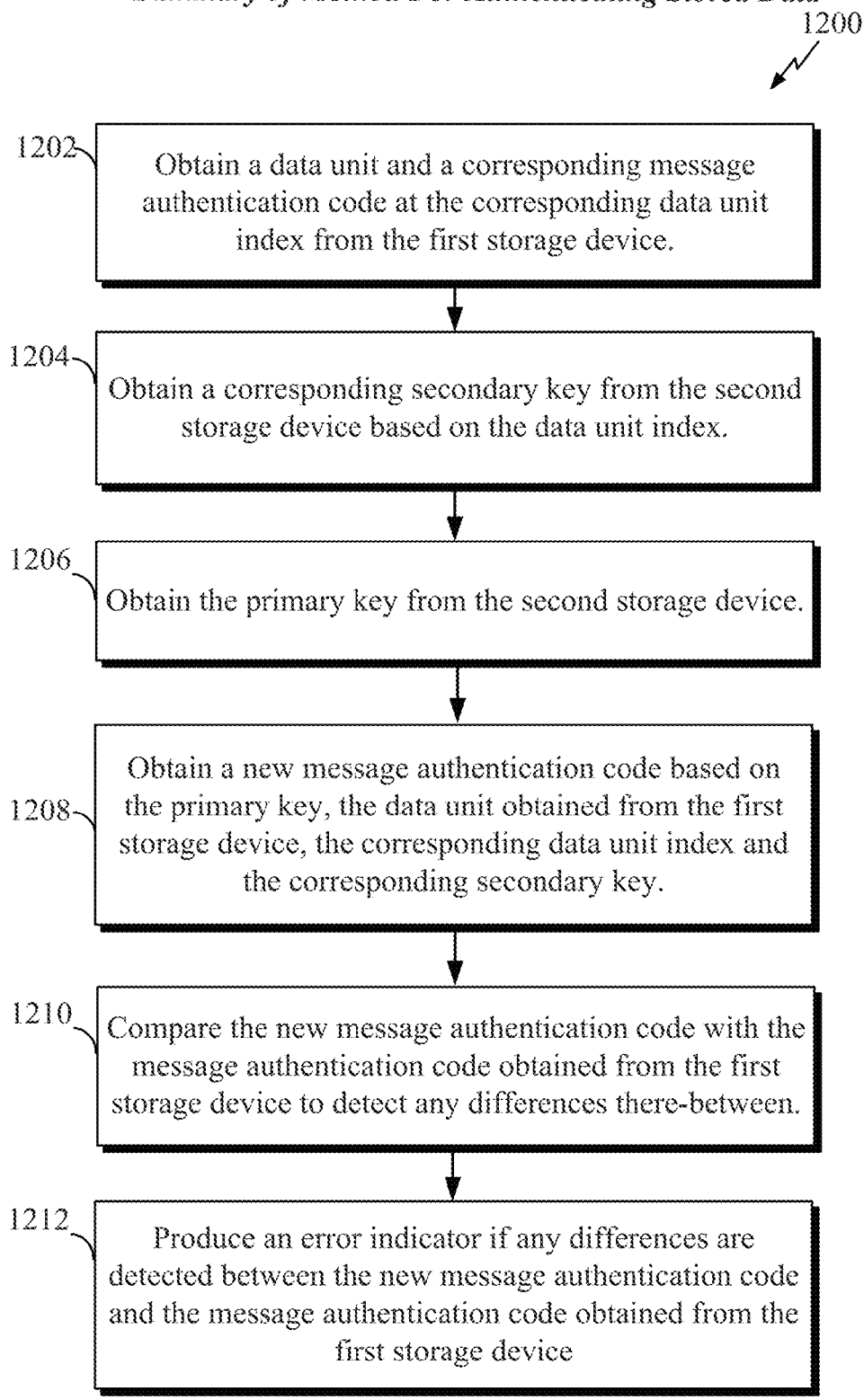
FIG. 12 summarizes an exemplary method for authenticating stored data.

FIG. 12 broadly illustrates and summarizes methods or procedures 1200 that may be performed by processing circuit 804 of FIGS. 8 and 9 or other suitably equipped devices for authenticating stored data. At step 1202, the processing circuit obtains a data unit and a corresponding message authentication code at the corresponding data unit index from the first storage device. At step 1204, the processing circuit obtains a corresponding secondary key from the second storage device based on the data unit index. At step 1206, the processing circuit obtains the primary key from the second storage device. At step 1208, the processing circuit obtains a new message authentication code based on the primary key, the data unit obtained from the first storage device, the corresponding data unit index and the corresponding secondary key. At step 1210, the processing circuit compares the new message authentication code with the message authentication code obtained from the first storage device to detect any differences there-between. At step 1212, the processing circuit produces an error indicator if any differences are detected between the new message authentication code and the message authentication code obtained from the first storage device.

Also, it is noted that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It is contemplated that various features described herein may be implemented in different systems. It should be noted that the foregoing aspects of the disclosure are merely examples and are not to be construed as limiting. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method for storing data to permit authentication of the data, comprising:
   obtaining, at a processing circuit, a message authentication code based on a primary key, a data unit to be stored, an index corresponding to the data unit, and a secondary key corresponding to the index;
   storing the message authentication code and the data unit in a first storage device coupled to the processing circuit;
   storing the secondary key for the data unit in a second storage device coupled to the processing circuit;
   obtaining, at the processing circuit, a new secondary key upon each new data write operation to the first storage device of a corresponding data unit to be stored in the first storage device;
   obtaining, at the processing circuit, a new message authentication code based on the primary key, a data unit retrieved from the first storage device and its corresponding secondary key retrieved from the second storage device; and
   obtaining, at the processing circuit, the corresponding message authentication code from the first storage device for the retrieved data unit, and comparing the new message authentication code with the corresponding message authentication code, where authentication is successful if the new message authentication code and the corresponding message authentication code are the same.

2. The method of claim 1, further comprising authenticating a data unit stored in the first storage device by:
   obtaining a corresponding secondary key from the second storage device based on the index; and
   obtaining the primary key, wherein the primary key is obtained from the second storage device.

3. The method of claim 1, wherein the secondary key is substantially smaller than the message authentication code and the primary key.

4. The method of claim 1, wherein the message authentication code (MAC) is a tag (Ti) obtained for a corresponding data unit index (i) based on a global primary key (K), a per data unit secondary key (Ni), the data unit (Mi) and the data unit index (i).

5. The method of claim 4, wherein the tag (Ti) is obtained by applying a message authentication algorithm (MAA) to the corresponding data unit index (i) based on the global primary key (K), the secondary key (Ni), and the data unit (Mi).

6. The method of claim 5, further comprising concatenating a particular secondary key (Ni), a corresponding index (i) and the data unit (Mi) before the MAA is applied with the global primary key (K) to obtain the message authentication code (MAC).

7. The method of claim 1, wherein the secondary key is one of a random or pseudorandom value.

8. The method of claim 1, wherein all secondary key values are initially set to zero and all subsequent secondary key values are set to non-zero values.

9. The method of claim 1, wherein the method is operational within a system-on-a-chip device coupled to an off-chip storage device, and the first storage device includes the off-chip storage device.

10. The method of claim 1, wherein the method is operational within a system-on-a-chip device having an on-chip storage device, and the second storage device includes the on-chip storage device.

11. The method of claim 1, wherein the secondary key is small relative to the message authentication code (MAC).

12. The method of claim 1, wherein the secondary key is initially set to zero and all subsequent secondary keys are set to non-zero values.

13. A device comprising:
    a first storage device to store data units and message authentication codes;
    a second storage device to store authentication keys to authenticate the data units of the first storage device;
    a processing circuit coupled to the first and second storage devices, the processing circuit configured to obtain a message authentication code based on a primary key, a data unit to be stored, an index corresponding to the data unit, and a secondary key corresponding to the index; store the message authentication code and the data unit in the first storage device; store the secondary key for the data unit in the second storage device; obtain a new secondary key upon each new data write operation to the first storage device of a corresponding data unit to be stored in the first storage device; obtain, at the processing circuit, a new message authentication code based on the primary key, a data unit retrieved from the first storage device and its corresponding secondary key retrieved from the second storage device; and
    obtain, at the processing circuit, the corresponding message authentication code from the first storage device for the retrieved data unit, and comparing the new message authentication code with the corresponding message authentication code, where authentication is successful if the new message authentication code and the corresponding message authentication code are the same.

14. The device of claim 13, wherein the processing circuit is further configured to authenticate a data unit stored in the first storage device by:
    obtaining a corresponding secondary key from the second storage device based on the index; and
    obtaining the primary key, wherein the primary key is obtained from the second storage device.

15. The device of claim 13, wherein the processing circuit is further configured to set all secondary key values to zero initially and to set all subsequent secondary key values to non-zero values.

16. The device of claim 13, wherein the device is integrated within a system-on-a-chip device, and the first storage device includes an off-chip storage device.

17. The device of claim 13, wherein the device is integrated within a system-on-a-chip device, and the second storage device includes an on-chip storage device.

18. The device of claim 13, wherein the secondary key is small relative to the message authentication code (MAC).

19. The device of claim 13, wherein the secondary key is initially set to zero and all subsequent secondary keys are set to non-zero values.

20. A device, comprising:
    means for obtaining a message authentication code based on a primary key, a data unit to be stored, an index corresponding to the data unit, and a secondary key corresponding to the index;
    means for storing the message authentication code and the data unit in a first storage device;
    means for storing the secondary key for the data unit in a second storage device;

means for obtaining a new secondary key upon each new data write operation to the first storage device of a corresponding data unit to be stored;

means for obtaining a new message authentication code based on the primary key, a data unit retrieved from the first storage device and its corresponding secondary key retrieved from the second storage device; and means for obtaining the corresponding message authentication code from the first storage device for the retrieved data unit, and comparing the new message authentication code with the corresponding message authentication code, where authentication is successful if the new message authentication code and the corresponding message authentication code are the same.

21. The device of claim 20, further comprising:
means for obtaining a corresponding secondary key from the second storage device based on the index; and
means for obtaining the primary key, wherein the primary key is obtained from the first storage device.

22. The device of claim 20, wherein the means for obtaining the message authentication code (MAC) includes means for obtaining the MAC as a tag (Ti) for a corresponding data unit index (i) based on a global primary key (K), a per data unit secondary key (Ni), the data unit (Mi) to be stored and the data unit index (i).

23. The device of claim 22, wherein the means for obtaining the message authentication code (MAC) includes means for applying a message authentication algorithm (MAA) to the corresponding data unit index (i) based on the global primary key (K), the secondary key (Ni), and the data unit (Mi) to be stored.

24. The device of claim 20, further comprising means for setting new secondary key values to zero and for setting subsequent secondary key values to non-zero values.

25. A non-transitory medium-readable storage medium having one or more instructions which when executed by at least one processing circuit causes the at least one processing circuit to:
obtain a message authentication code based on a primary key, a data unit to be stored, an index corresponding to the data unit, and a secondary key corresponding to the index;
store the message authentication code and the data unit in a first storage device;
store the secondary key for the data unit in a second storage device;
obtain a new secondary key upon each new data write operation to the first storage device of a corresponding data unit to be stored;
obtain a new message authentication code based on the primary key, a data unit retrieved from the first storage device and its corresponding secondary key retrieved from the second storage device; and
obtaining the corresponding message authentication code from the first storage device for the retrieved data unit, and comparing the new message authentication code with the corresponding message authentication code, where authentication is successful if the new message authentication code and the corresponding message authentication code are the same.

26. The non-transitory machine-readable storage medium of claim 25, further having one or more instructions which when executed by at least one processing circuit causes the at least one processing circuit to:
obtain a corresponding secondary key from the second storage device based on the index; and
obtain the primary key, wherein the primary key is obtained from the second storage device.

* * * * *